United States Patent [19]
Erickson et al.

[11] Patent Number: 5,915,591
[45] Date of Patent: Jun. 29, 1999

[54] ELECTRIC SOLENOID VALVE FOR HOT MELT ADHESIVE AND METHOD THEREFOR

[75] Inventors: Perry Dennis Erickson, Lebanon; Chris Mark Jamison, Hendersonville, both of Tenn.

[73] Assignee: Illinois Tool Works Inc., Glenview, Ill.

[21] Appl. No.: 08/926,932

[22] Filed: Sep. 10, 1997

[51] Int. Cl.[6] ................................................... G01F 11/00
[52] U.S. Cl. .............................. 222/1; 222/504; 222/518; 239/585.1; 239/900
[58] Field of Search ........................... 222/1, 146.5, 333, 222/504, 518; 239/585.1, 585.2, 585.4, 900

[56] References Cited

U.S. PATENT DOCUMENTS

| | | | |
|---|---|---|---|
| 4,320,858 | 3/1982 | Mervcer et al. | 222/504 |
| 4,437,488 | 3/1984 | Taggert et al. | 137/334 |
| 4,453,652 | 6/1984 | Merkel et al. | 222/504 |
| 4,479,590 | 10/1984 | Slautterback | 222/146.5 |
| 4,488,665 | 12/1984 | Cocks et al. | 222/146.5 |
| 4,524,887 | 6/1985 | Cocks | 222/146.5 |
| 4,602,741 | 7/1986 | Faulkner, III et al. | 239/135 |
| 4,659,016 | 4/1987 | Faulkner, III | 222/52 |
| 4,711,379 | 12/1987 | Price | 222/504 |
| 4,721,252 | 1/1988 | Colton | 239/424.5 |
| 4,759,477 | 7/1988 | Gelinas et al. | 222/504 |
| 4,768,718 | 9/1988 | Faulkner, III | 239/410 |
| 4,849,049 | 7/1989 | Colton | 156/291 |
| 4,922,852 | 5/1990 | Price | 118/683 |
| 4,951,917 | 8/1990 | Faulkner, III | 251/129.15 |
| 4,962,871 | 10/1990 | Reeves | 222/504 |
| 4,969,601 | 11/1990 | Wright | 239/135 |
| 4,969,602 | 11/1990 | Scholl | 239/298 |
| 4,970,985 | 11/1990 | Slautterback | 118/300 |
| 4,978,101 | 12/1990 | Nakaya et al. | 251/129.15 |
| 4,988,015 | 1/1991 | Price | 222/1 |
| 5,027,976 | 7/1991 | Scholl et al. | 222/1 |
| 5,065,910 | 11/1991 | Fiedler | 222/504 |
| 5,078,325 | 1/1992 | Waryu et al. | 239/526 |
| 5,172,833 | 12/1992 | Faulkner, III | 222/146.5 |
| 5,217,169 | 6/1993 | Faulkner, III et al. | 239/562 |
| 5,261,610 | 11/1993 | Waryu et al. | 239/585.4 |
| 5,320,250 | 6/1994 | Le et al. | 222/1 |
| 5,375,738 | 12/1994 | Walsh et al. | 222/1 |
| 5,405,050 | 4/1995 | Walsh | 222/1 |
| 5,407,101 | 4/1995 | Hubbard | 222/146.5 |
| 5,535,919 | 7/1996 | Ganzer | 222/1 |

Primary Examiner—Joseph A. Kaufman
Attorney, Agent, or Firm—Donald J. Breh

[57] ABSTRACT

An electric solenoid valve and method therefor including an armature reciprocatably disposed in an axial bore of a housing member having a fluid inlet and a fluid outlet coupled to the axial bore at a first end thereof. The armature includes a valve member disposed at a first end portion thereof, and a magnetically attractable second end portion defining a second end thereof disposed toward a fixed core portion of the solenoid. The armature also includes an interior fluid passage with a fluid inlet disposed between the fluid inlet of the housing member and the second end of the armature to couple the interior fluid passage with the fluid inlet of the housing member. A fluid outlet is disposed proximate the valve member of the armature and is coupleable to the fluid outlet of the housing member when the valve member is unseated from a valve seat disposed along the axial bore proximate the fluid outlet of the housing member, whereby the electric solenoid valve has reduced fluid stagnation, improved actuation responsiveness, and is integrateable with fluid dispensing systems.

21 Claims, 2 Drawing Sheets

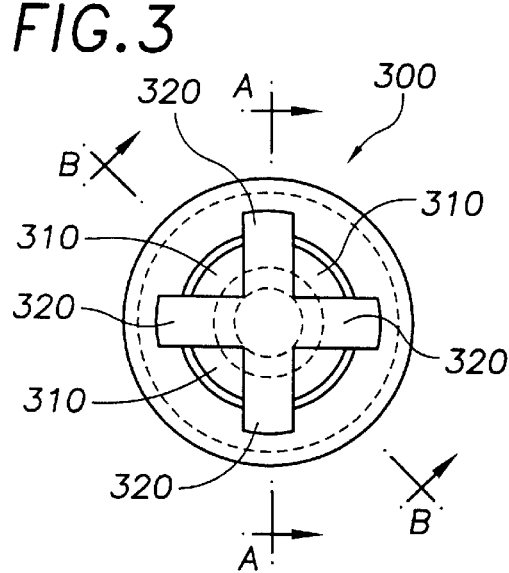
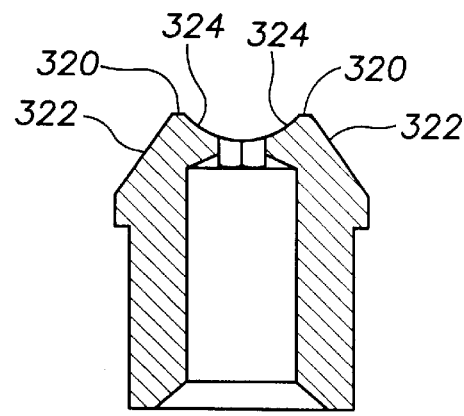
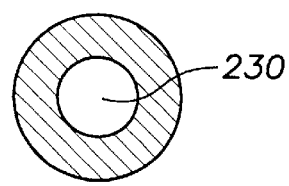
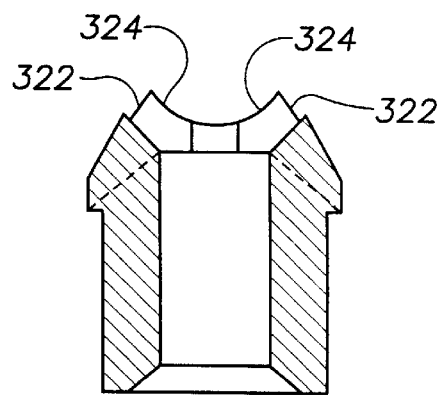
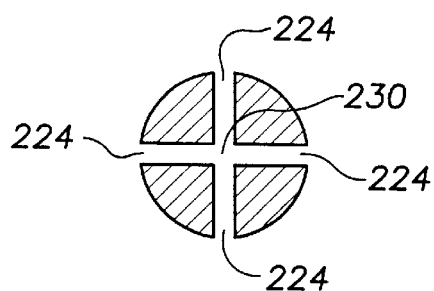
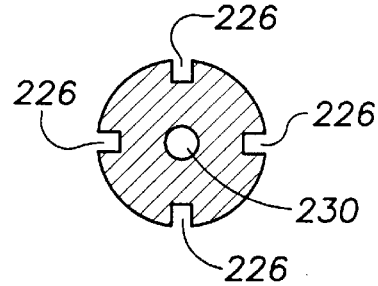
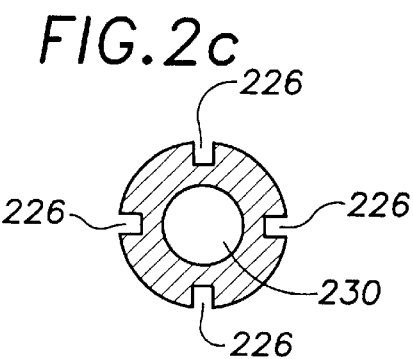

ELECTRIC SOLENOID VALVE FOR HOT MELT ADHESIVE AND METHOD THEREFOR

BACKGROUND OF THE INVENTION

The invention relates generally to electric solenoid valves for controlling intermittent fluid flow and methods therefor, and more particularly to electric solenoid valves useable for intermittently dispensing relatively high viscosity fluids including hot melt adhesives.

The intermittent dispensing of viscous fluids with an electric solenoid valve having an armature reciprocatably disposed in a housing is known generally and has many applications. Hot melt adhesives for example are dispensed to seal cardboard cartons and other packaging, referred to herein generally as a substrate, in assembly-line operations, wherein typically a plurality of individually actuatable electric solenoid valves are coupled to a common manifold to form a modular adhesive dispensing assembly. The compactness of many modular assemblies is promoted by supplying fluid to a side portion of the housing of each electric solenoid valve, substantially transverse to the armature axis, rather than from along an axial end of the armature.

Hot melt adhesives and other heated viscous fluids have a tendency to degrade rapidly when allowed to stagnate, as occurs frequently in intermittent dispensing applications, particularly in electric solenoid valves having non-linear fluid flow paths, which tend to generate fluid flow eddies and regions of little or no flow. The transversely disposed fluid inlets found on many modular assemblies are thus particularly susceptible to undesirable fluid stagnation.

U.S. Pat. No. 5,172,833 entitled "Modular Applicator Having A Separate Flow Loop To Prevent Stagnant Regions" issued on Dec. 22, 1992 to Faulkner III discloses an electric solenoid valve module having an armature reciprocatably disposed in a guide tube. Fluid is dispensed from an outlet port of the module by unseating a spherical end portion of the armature from a seat upon energizing the solenoid. A fluid inlet located on a top side of the module supplies fluid radially inwardly to an adhesive chamber disposed about the armature, wherein fluid flows divergently in oppositely directed high and low volume flow paths. The high-volume flow path is along the armature toward the spherical end portion thereof near the module outlet port, and the low-volume flow path is along the armature toward an opposing end thereof, near a pole-piece of the solenoid. The low-volume flow path circulates through a bore of the armature and then back toward the spherical end portion thereof where it reunites with the high-volume flow path, thereby circulating fluid to reduce stagnation.

In some hot melt adhesive dispensing applications the fluid is dispensed continuously to form continuous adhesive beads on the substrate where bonding is required, and in other applications the fluid is dispensed intermittently to form a series of adhesive dots on the substrate. The latter, intermittent fluid dispensing operations provide, among other advantages, economized adhesive usage and reduced heat transfer to the substrate. Intermittent fluid dispensing operations however require relatively short valve opening and closing times, or increased actuation responsiveness, particularly where smaller adhesive dot formation is required and in applications having relative high velocities between the substrate and fluid dispensing valve.

U.S. Pat. No. 4,951,917 entitled "Dynamic Response Time For Electromagnetic Valving" issued on Aug. 28, 1990 to Faulkner III discloses an armature having an upstream end with C-shaped raised lips disposed peripherally thereon relative to a recessed region, wherein the raised lips abut a pole piece of the solenoid against the bias of a compressed spring therebetween when the solenoid is energized. The C-shaped raised lips of the armature allegedly reduce closing response time by facilitating migration of viscous fluid between the armature and the pole piece when the solenoid is de-energized, wherein fluid re-circulates back toward the end of the armature along longitudinal grooves disposed peripherally thereon. However, the recessed region on the end of the armature and the longitudinal grooves along the peripheral sides of the armature reduce the sectional area of the armature end thereby reducing the magnetic attraction between the pole piece and the armature, which adversely affects valve opening response time when the solenoid is energized.

The present invention is drawn toward advancements in the art of electric solenoid valves, and more particularly to electric solenoid valves useable for intermittently dispensing relatively high viscosity fluids including hot melt adhesives.

It is thus an object of the invention to provide novel electric solenoid valves and methods therefor that overcome problems in the prior art.

It is also object of the invention to provide novel electric solenoid valves and methods therefor that reduce fluid stagnation, that provide improved actuation responsiveness, particularly during intermittent fluid dispensing operations, that are integrateable with fluid dispensing systems, that are retrofittable on existing fluid dispensing assemblies, and that are economical and reliable.

It is another object of the invention to provide novel electric solenoid valves and methods therefor, wherein the electric solenoid valve comprises generally an armature reciprocatably disposed in an axial bore of a housing member having a fluid inlet and a fluid outlet coupled to the axial bore at a first end thereof. The armature includes a valve member disposed at a first end portion thereof, and a magnetically attractable second end portion defining a second end of the armature disposed toward a relatively fixed core portion of the solenoid. The armature includes an interior fluid passage with a fluid inlet disposed between the fluid inlet of the housing member and the second end of the armature to couple the interior fluid passage with the fluid inlet of the housing member. A fluid outlet is disposed proximate the valve member of the armature and is coupleable to the fluid outlet of the housing member when the valve member is unseated from a valve seat disposed along the axial bore proximate the fluid outlet of the housing member.

It is a more particular object of the invention to provide novel electric solenoid valves and methods therefor that reduce fluid stagnation by circulating fluid supplied to the axial bore of the housing member to a fluid inlet of the armature disposed between the fluid inlet of the housing member and the second end of the armature, and circulating fluid from the interior passage of the armature toward a fluid outlet of the armature disposed proximate the valve member thereof. The valve member of the armature is seated on a valve seat of the housing member to obstruct fluid flow from the fluid outlet of the housing member, and the valve member of the armature is unseatable from the valve seat to permit fluid flow from the fluid outlet of the housing member.

It is also a more particular object of the invention to provide novel electric solenoid valves and methods therefor that reduce fluid stagnation by isolating the fluid outlet of the armature from the axial bore of the housing member with a substantially fluid impermeable seal formed between the first end portion of the armature and the housing member, whereby fluid supplied from the fluid inlet of the housing member is directed toward the fluid inlet of the armature, and additionally by circulating fluid along a secondary fluid flow path about the second end of the armature into the interior fluid passage thereof.

It is another more particular object of the invention to provide novel electric solenoid valves and methods therefor that provide improved actuation responsiveness during intermittent fluid dispensing operations by any one or more of the following. Increasing an area of the second end of the armature facing toward the core portion of the solenoid, increasing the magnetic attraction between the armature and the fixed core portion of the solenoid by forming the fluid inlet of the armature away from the second end of the armature, forming an intermediate portion of the armature of a non-magnetically attractable tubular portion, which is lightweight relative to the magnetically attractable second end portion of the armature, and disposing a non-magnetically attractable shim between the end of the fixed core portion of the solenoid and the second end of the armature to facilitate separation of the armature from the fixed core portion upon de-energizing the solenoid.

These and other objects, features, aspects and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2a is a partial sectional view along lines a—a of FIG. 1 illustrating a section of an armature.

FIG. 2b is a partial sectional view along lines b—b of FIG. 1 illustrating another section of the armature.

FIG. 2c is a partial sectional view along lines c—c of FIG. 1 illustrating yet another section of the armature.

FIG. 2d is a partial sectional view along lines d—d of FIG. 1 illustrating still another section of the armature.

FIG. 3 is a partial end view of along lines e—e of FIG. 1 illustrating a carrier portion of the armature.

FIG. 4a is a partial sectional view along lines a—a of FIG. 3.

FIG. 4b is a partial sectional view along lines b—b of FIG. 3.

DETAILED DESCRIPTION OF THE INVENTION

Figure 1:
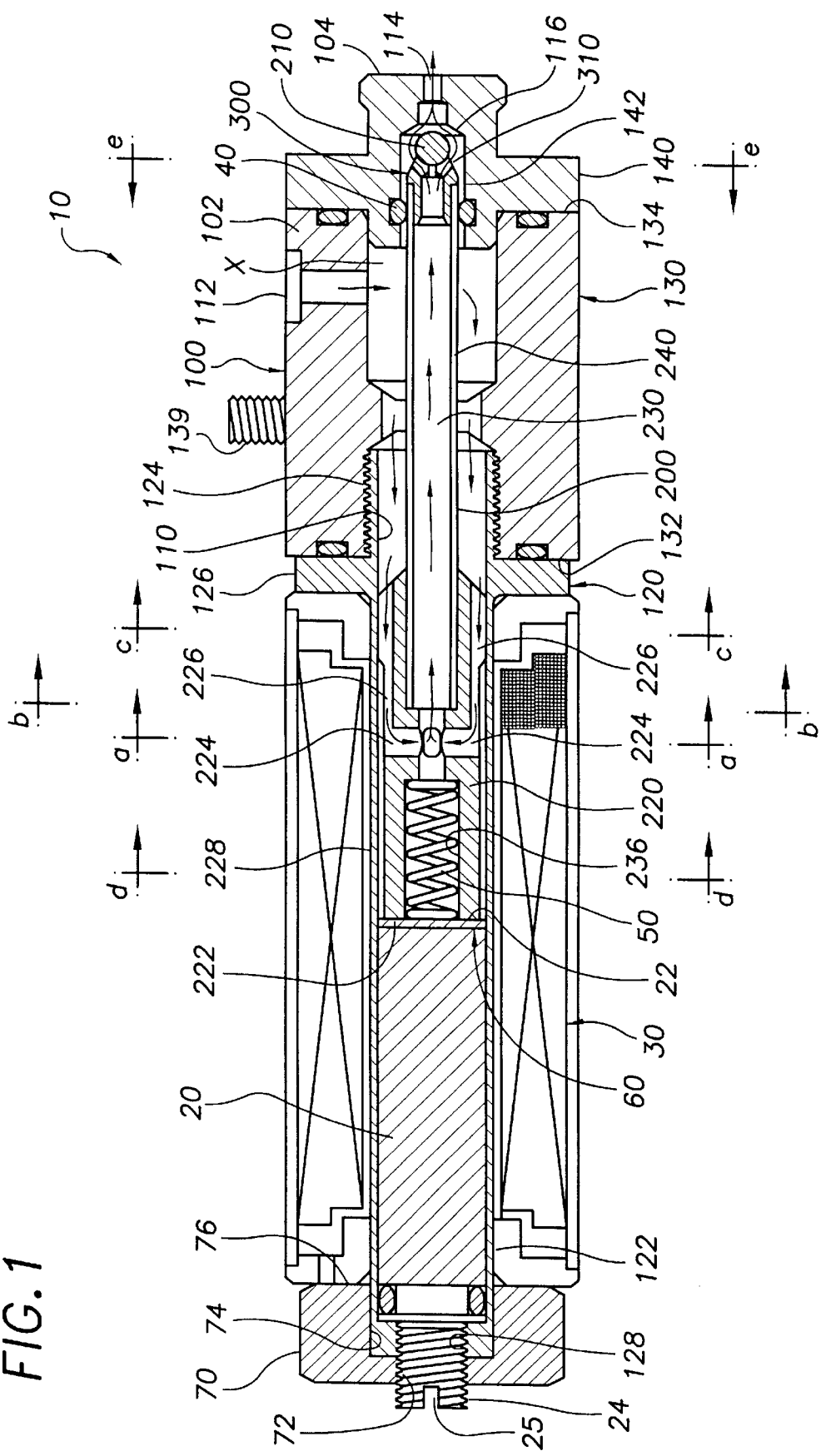
FIG. 1 is a partial sectional view of an electric valve for dispensing hot melt adhesives according to an exemplary embodiment of the invention.

FIG. 1 is an electric solenoid valve 10 useable for dispensing viscous fluids, particularly hot melt adhesives. According to the exemplary embodiment, the electric solenoid valve 10 is one of a plurality of electric solenoid valves coupled to a common manifold, or service block, for example Part No. BF-0441-BD-2S available from ITW Dynatec, an Illinois Tool Works Company, Hendersonville, Tenn., not shown in the drawing, which distributes the hot melt adhesive to the plurality of valves.

The electric solenoid valve 10 comprises generally a housing member 100 having an axial bore 110 coupled to a fluid inlet 112 and a fluid outlet 114 at a first end thereof. A valve seat 116 is disposed along the axial bore 110 proximate the fluid outlet 114, and an armature 200 is reciprocatably disposed in the axial bore 110 of the housing member. The armature 200 includes a valve member 210 disposed at a first end portion thereof, and a magnetically attractable second end portion 220 defining a second end 222 disposed toward a relatively fixed core portion 20, which is surrounded by a solenoid coil 30.

The armature 200 includes generally an interior fluid passage 230 with a fluid inlet disposed between the fluid inlet 112 of the housing member 100 and the second end 222 of the armature 200 to couple the interior fluid passage 230 with the fluid inlet 112 of the housing member. The armature 200 also includes a fluid outlet disposed proximate the valve member 210 thereof and coupleable to the fluid outlet 114 of the housing member 100. Fluid supplied from the fluid inlet 112 of the housing member 100 is circulated along an exterior of the armature 200 to the armature fluid inlet and then along the interior fluid passage 230 thereof toward the fluid outlet of the armature 200, whereby stagnation of fluid supplied from the fluid inlet 112 of the housing member 100 to the fluid outlet 114 of the housing member 100 is reduced.

A first sealing member 40 is disposed about the first end portion of the armature 200 and forms a substantially fluid impermeable seal between the first end portion of the armature and the housing member 100 to isolate the fluid outlet of the armature 200 from the axial bore 110 of the housing member 100. According to this aspect of the invention, substantially all fluid supplied from the fluid inlet 112 of the housing member 100 is directed toward the fluid inlet of the armature 200. The fluid inlet 112 of the housing member 100 is disposed on a side portion 102 of the housing member 100 toward a first end portion 104 of the housing member 100, and more particularly near the first sealing member 40 to eliminate or substantially reduce fluid stagnation and eddy formation generally, and particularly between the fluid inlet 112 and the first sealing member 40. Mounting and alignment considerations between the between electric solenoid valve 10 and the service block, not shown, may impose limitations on the precise location of the fluid inlet 112 on the housing member 100. Generally, the fluid inlet 112 is located proximate the first scaling member 40 to reduce and preferably eliminate dead-end fluid flow paths therebetween, indicated as X in FIG. 1, thereby reducing fluid stagnation and eddy formation between the fluid inlet 112 of the housing member 100 and the first end portion of the armature 200. The fluid inlet 112 of the exemplary embodiment is configured for alignment with an adhesive outlet of the service block, Part No. BF-0441-BD-2S, available from ITW Dynatec, an Illinois Tool Works Company, Hendersonville, Tenn.

The housing member 100 of the exemplary embodiment comprises a tube member 120 having a cylindrical portion 122 with a threaded end portion 124 and a radial flange 126 therebetween, and a body member 130 having a first end 132 threadably coupled to the threaded end portion 124 and sealingly against the flange 126 of the tube member 120, wherein the axial bore 110 extends through both the tube member 120 and the body member 130. Two fluid inlets 112 arranged side by side, only one of which is shown, are disposed in the body member 130 in fluid communication with the axial bore 110. An end plate 140 having an axial bore portion 142 defining the valve seat 116 and coupled to the fluid outlet 114 is sealingly coupled to a second end 134 of the body member 130, wherein the first sealing member 40 forms the substantially fluid impermeable seal between the first end portion of the armature 200 and the axial bore portion 142 of the end plate 140.

Generally, the housing member 100, and in the exemplary embodiment the body member 130, includes one or more mounting bolts 139 for fastening to the manifold or service block, not shown. Also, electrical signals are communicated from the manifold or otherwise to the electric solenoid valve 10, and more particularly to the solenoid coil 30, through electrical leads or pins, not shown in the drawing but known in the art. In the exemplary embodiment, the tube member 120 and the end plate 140 are formed of 304 stainless steel, and the body member is formed of 2024-T3 aluminum.

FIG. 1 illustrates the fluid inlet of the armature 200 defined by a plurality of primary fluid flow paths 224 directed inwardly to the interior fluid passage 230 thereof shown also in the partial sectional view of FIG. 2a. The inwardly directed fluid flow paths 224 are disposed away, or spaced apart, from the second end 222 of the armature to maximize the surface area of the second end 222 adjacent the fixed core portion 20 of the solenoid, which correspondingly increases magnetic attraction between the armature 200 and the core portion 20 upon energizing the solenoid coil 30, thereby increasing actuation responsiveness of the armature 200. In the exemplary embodiment of FIG. 1, the fluid inlet of the armature 200 is defined further by a plurality of fluid flow paths 226 disposed longitudinally along the second end portion 220 thereof, shown also in FIGS. 2b and 2c, wherein each longitudinal fluid flow path 226 couples the fluid inlet 112 of the housing member 100 to a corresponding inwardly directed fluid flow path 224. Thus according to this aspect of the invention, fluid from the fluid inlet 112 of the housing member 100 is circulated along the axial bore 110 thereof and along the exterior of the armature 200 to the fluid inlet thereof, into the interior passage 230, and toward the fluid outlet of the armature proximate the valve member 210.

The armature 200 in the exemplary embodiment of FIG. 1 includes an intermediate tubular portion 240 disposed between the valve member 210 and the second end portion 220. A sectional diameter of the tubular portion 240 is reduced substantially relative to a sectional diameter of the second end portion 220, whereby fluid from the fluid inlet 112 of the housing member 100 is supplied freely along the exterior of the tubular portion 240 to the fluid inlet of the armature 200, and more particularly to the longitudinal fluid flow paths 226 thereof, then to the interior fluid passage 230 of the armature 200 and toward the fluid outlet 114 of the housing member 100 for intermittent dispensing as discussed above and further below. The reduced size of the intermediate tubular portion 240 of the armature 200 is lightweight relative to the magnetically attractive second end portion 220 thereof, and is preferably non-magnetically attractive thereby reducing the overall weight of the armature 200 and increasing the actuation responsiveness of the armature 200. In the exemplary embodiment the core portion 20 and the magnetically attractive second end portion 220 of the armature 200 are fabricated from vanadium-permandur, and the intermediate tubular portion 240 is 304 stainless steel tubing, which is press fit or otherwise fastened to the second end portion 220.

According to another aspect of the invention shown in FIGS. 1 and 2d, the interior fluid passage 230 of the armature 200 extends through the second end 222 thereof, and the armature 200 includes a secondary fluid flow path from the fluid inlet of the armature to the second end 222 thereof, whereby fluid flow along the secondary fluid flow path is circulated into the interior fluid passage 230 of the armature 200. A sectional diameter of a portion 228 of the second end portion 220 of the armature 200 between the second end 222 and the inwardly directed fluid flow paths 224 is reduced slightly relative to a sectional diameter of remaining portions of the second end portion 220 thereof. The reduced diameter portion 228 thus forms space between the armature 200 and the housing member 100, partially defining the secondary fluid flow path along the axial bore 110 of the housing member 100. Fluid flow along the secondary fluid flow path is thus circulated into the interior fluid passage 230 of the armature to prevent stagnation of fluid between the second end 222 of the armature 200 and the core portion 20 as the armature 200 reciprocates relative thereto as discussed further below.

The reduced diameter portion 228 of the armature 200 decreases the sectional area thereof, particularly the second end 222, which correspondingly reduces the force applicable to the armature 200 by the energized solenoid coil 30. The diameter portion 228 however is reduced only slightly to minimize any adverse effect. In the exemplary hot melt adhesive dispensing application a ratio between the reduced diameter portion 228 of the armature 200 and the diameter of the axial bore 110 through the housing member 100 is approximately 0.948 mm, which does not adversely affect the magnetically induced attractive force on the armature 200. Generally, the ratio may be more or less depending upon fluid viscosity and other factors. Reduction in the sectional area of the second end 222 is thus balanced against the tendency of the reduced sectional area to reduce the force applicable to the armature.

In FIG. 1, the valve member 210 is a ball member coupled to the tubular member 240 of the armature 200 by a carrier 300 having a plurality of openings 310 coupling the interior fluid passage 230 of the armature 200 to the fluid outlet 114 of the housing member 100 when the ball member 210 is unseated from the valve seat 116. FIG. 3 is a partial end view of the carrier 300, without valve member 210, illustrating the plurality of openings 310 disposed between support members 320. FIGS. 4a and 4b show each support member 320 having tapered outer sides 322 and a curved inner side 324, wherein the combined curved inner sides 324 form an arcuate seat for receiving the valve member 210. In the exemplary embodiment, the ball member 210 is a carbide material and the carrier 300 is 304 stainless steel. The carbide ball 210 is brazed or otherwise fastened to the seat of the carrier 300, which is pressed or otherwise fastened into the tube member 240 of the armature 200. According to this aspect of the invention, the carrier 300 and ball valve member 210 obviate the necessity of drilling holes in the armature 200 to form the fluid outlet thereof. Drilled fluid outlet holes are an alternative, but may be more costly to fabricate and may have a tendency to abrasively degrade the first sealing member 40. Locating the fluid outlet of the armature 200 between the tapered side portions 322 of the carrier 300 eliminates the potential abrasion problem.

FIG. 1 illustrates a spring member 50 disposed at least partially in a recess 236 in the second end portion 220 of the armature 200, wherein the spring member 50 is engageable with an end 22 of the fixed core portion 20 to bias the valve member 210 of the armature 200 into engagement with the valve seat 116 of the housing member 100 thereby obstructing fluid flow from the fluid outlet 114 thereof, whereby energizing the solenoid coil 30 unseats the valve member 210 from the valve seat 116 against the bias of the spring member 50 to permit fluid flow from the fluid outlet 114 of the housing member 100. The spring member 50 and the recess 236 preferably have reduced sectional diameters to maximize the sectional area of the second end 222, which is desired for maximizing the actuation force applied to the armature by the energized solenoid coil 30 as discussed above.

In FIG. 1, a non-magnetically attractable shim 60 is disposed between the end 22 of the fixed core portion 20 and the second end 222 of the armature 220 to facilitate separation, or release, of the second end portion 220 of the armature 200 from the fixed core portion 20 upon de-energizing the solenoid coil 30, thereby increasing the actuation responsiveness of the armature 200. In the exemplary embodiment, the shim 60 is a brass material and has a thickness between approximately 0.003 inches and approximate 0.005 inches, and in a presently preferred embodiment the shim 60 has a thickness of approximately 0.004 inches. The shim 60 may be adhered or otherwise fastened to the end 22 of the core portion 20, and according to this configuration, the spring member 50 acts on the shim 60. And in another embodiment, the shim 60 is a non-magnetic coating applied to one or both of the second end 222 of the armature 200 and the end 22 of the fixed core portion 20.

The fixed core portion 20 of the solenoid 30 is adjustably disposed along the axial bore 110 of the housing member 100, and in the exemplary embodiment along cylindrical portion 122 of the tube member 120, relative to the armature 200, to adjust a spacing between the unseated valve member 210 and the valve seat 116 of the housing member 100, thereby adjusting fluid flow from the fluid outlet 114 thereof. This adjustment is desirable to compensate for different fluid viscosities. The core portion 20 includes, for this purpose, a threaded end portion 24 with a tool engageable end 25, wherein the threaded end portion 24 is engageable with a threaded portion 128 of the axial bore 110 through the housing member 100, which in the exemplary embodiment is toward an end of the tube member 120. Rotation of the core portion 20 thus axially advances or retracts the core portion 20 relative to the armature 200 to adjust the spacing between the unseated valve member 210 and the valve seat 116.

In FIG. 1, the solenoid coil 30 is disposed and retained about the cylindrical portion 122 of the tube member 120 by a cap member 70 having a threaded bore 72 threadably engageable with the threaded end portion 24 of the core portion 20, which is seated in a recessed portion 74 of the cap member 70. The solenoid coil 30 is thus retained between an inner surface 76 of the cap member 70 and the flange 126 of the tube member 120.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. An electric solenoid valve useable for intermittently dispensing viscous fluids including hot melt adhesives, the electric solenoid valve comprising:

a housing member having an axial bore, the housing member having a fluid inlet coupled to the axial bore and a fluid outlet coupled to the axial bore at a first end of the housing member;

a valve seat disposed along the axial bore of the housing member proximate the fluid outlet of the housing member;

an armature reciprocatably disposed in the axial bore of the housing member, the armature including a valve member disposed at a first end portion of the armature, and the armature having a magnetically attractable second end portion defining a second end disposed toward a relatively fixed core portion of the solenoid, the armature having an interior fluid passage with a fluid inlet and a fluid outlet, the fluid inlet of the armature spaced apart from the second end of the armature to increase magnetic attraction between the armature and the fixed core portion of the solenoid.

the fluid outlet of the armature disposed proximate the valve member of the armature and coupleable to the fluid outlet of the housing member, whereby the armature has increased actuation responsiveness.

2. The electric solenoid of claim 1 further comprising a first sealing member disposed about the first end portion of the armature and forming a substantially fluid impermeable seal between the first end portion of the armature and the housing member, the first sealing member disposed between the fluid inlet of the housing member and the fluid outlet of the armature.

3. The electric solenoid of claim 1, the interior fluid passage of the armature extends through the second end of the armature, the armature having a secondary fluid flow path extending from the fluid inlet of the armature to the interior fluid passage on the second end of the armature.

4. The electric solenoid of claim 1, the armature having an intermediate tubular portion partially defining the interior fluid passage of the armature between the valve member and the second end portion of the armature, a sectional diameter of the tubular portion reduced substantially relative to a sectional diameter of the second end portion of the armature, whereby fluid supplied from the fluid inlet of the housing member is supplied along an exterior of the tubular portion to the fluid inlet of the armature and then along the interior fluid passage of the armature toward the fluid outlet of the housing member.

5. The electric solenoid of claim 4, the intermediate tubular portion of the armature is non-magnetically attractive and is lightweight relative to the magnetically attractive second end portion, whereby the armature has increased actuation responsiveness.

6. The electric solenoid of claim 4, the valve member is a ball member coupled to the intermediate tubular portion by a carrier having a plurality of openings coupling the interior fluid passage of the armature to the fluid outlet of the housing member when the ball member is unseated from the valve seat.

7. The electric solenoid of claim 1, the fluid inlet of the armature defined by a plurality of fluid flow paths disposed longitudinally along the second end portion of the armature and by a plurality of primary fluid flow paths directed inwardly to the interior fluid passage of the armature and spaced apart from the second end of the armature, each longitudinal fluid flow path coupling the fluid inlet of the housing member to a corresponding primary fluid flow path.

8. The electric solenoid valve of claim 1 further comprising a spring member disposed at least partially in a recess of the second end portion of the armature, the spring member engageable with an end of the fixed core portion, the spring member biasing the valve member of the armature into engagement with the valve seat of the housing member to obstruct fluid flow from the fluid outlet of the housing member, whereby energizing the solenoid unseats the valve member from the valve seat against the bias of the spring member to permit fluid flow from the fluid outlet of the housing member.

9. The electric solenoid of claim 8, the fixed core portion of the solenoid is adjustably disposed along the axial bore of the housing member relative to the armature, whereby a spacing between the unseated valve member and the valve seat is adjustable.

10. The electric solenoid valve of claim 1 further comprising a non-magnetically attractable shim disposed between the fixed core portion and the second end of the armature to facilitate separation of the second end portion of the armature from the fixed core portion of the solenoid upon de-energizing the solenoid, whereby the armature has increased actuation responsiveness.

11. A method of intermittently supplying viscous fluids including hot melt adhesives with an electric solenoid valve, the method comprising:

reciprocatably disposing an armature in an axial bore of a housing member, the armature including a valve member disposed at a first end portion of the armature, the armature having a magnetically attractable second end portion disposed toward a relatively fixed core portion of the solenoid;

supplying fluid from a fluid inlet of the housing member to the axial bore of the housing member, the fluid inlet of the housing member disposed on a side portion of the housing member toward the first end portion of the armature;

circulating substantially all fluid supplied from the fluid inlet of the housing member to a fluid inlet of the armature;

circulating fluid from the fluid inlet of the armature through an interior fluid passage of the armature toward a fluid outlet of the armature, the fluid outlet of the armature disposed proximate the valve member of the armature;

seating the valve member of the armature on a valve seat disposed along the axial bore of the housing member to obstruct fluid flow from the fluid outlet of the housing member;

unseating the valve member of the armature from the valve seat of the housing member to couple the fluid outlet of the armature to the fluid outlet of the housing member and to permit fluid flow from the fluid outlet of the housing member, whereby stagnation of fluid supplied from the fluid inlet of the housing member to the fluid outlet of the housing member is reduced.

12. The method of claim 11, circulating substantially all fluid supplied from the fluid inlet of the housing member to the fluid inlet of the armature by forming a substantially fluid impermeable seal between the first end portion of the armature and the housing member, the substantially fluid impermeable seal located between the fluid inlet of the housing member and the fluid outlet of the armature.

13. The method of claim 11 further comprising increasing magnetic attraction between the armature and the fixed core portion of the solenoid by forming the fluid inlet of the armature as a plurality of primary fluid flow paths directed inwardly to the interior fluid passage of the armature, the inwardly directed fluid flow paths spaced apart from a second end of the armature, whereby the armature has increased actuation responsiveness.

14. The method of claim 13 further comprising circulating fluid along a secondary fluid flow path into the interior fluid passage of the armature, the secondary fluid flow path extending from the fluid inlet of the armature to the interior fluid passage on the second end of the armature.

15. The method of claim 11 further comprising increasing actuation responsiveness of the armature by forming an intermediate portion of the armature of a non-magnetically attractable tubular portion, the tubular portion lightweight relative to the second end portion of the armature.

16. The method of claim 11 further comprising biasing the valve member of the armature into engagement with the valve seat of the housing member with a spring member disposed at least partially in a recess of the second end portion of the armature, the spring member engageable with an end of the fixed core portion, whereby energizing the solenoid unseats the valve member from the valve seat against the bias of the spring member.

17. The method of claim 11 further comprising increasing actuation responsiveness of the armature by disposing a non-magnetically attractable shim between the end of the fixed core portion and the second end of the armature, whereby the shim facilitates separation of the second end portion of the armature from the fixed core portion of the solenoid upon de-energizing the solenoid.

18. An electric solenoid valve useable for intermittently dispensing viscous fluids including hot melt adhesives, the electric solenoid valve comprising:

a housing member having an axial bore, a fluid inlet coupled to the axial bore, and a fluid outlet coupled to the axial bore at a first end of the housing member;

a valve seat disposed along the axial bore of the housing member proximate the fluid outlet of the housing member;

an armature reciprocatably disposed in the axial bore of the housing member, the armature including a valve member disposed at a first end portion of the armature, and the armature having a magnetically attractable second end portion disposed toward a relatively fixed core portion of the solenoid, the armature having an interior fluid passage with a fluid inlet and a fluid outlet, the fluid outlet of the armature disposed proximate the valve member of the armature and coupleable to the fluid outlet of the housing member;

a first sealing member disposed about the first end portion of the armature between the fluid inlet of the housing member and the fluid outlet of the armature, the first sealing member forming a substantially fluid impermeable seal between the armature and the housing member.

19. The electric solenoid of claim 18, the fluid inlet of the housing member is disposed on a side portion of the housing member toward the first end portion of the armature, whereby fluid stagnation between the fluid inlet of the housing member and the first end portion of the armature is reduced.

20. The electric solenoid valve of claim 18, the second end portion of the armature defining a second end of the armature, the fluid inlet of the armature defined by a plurality of primary fluid flow paths directed inwardly to the interior fluid passage of the armature, the inwardly directed fluid flow paths are spaced apart from the second end of the armature to increase magnetic attraction between the armature and the fixed core portion of the solenoid, whereby the armature has increased actuation responsiveness.

21. The electric solenoid of claim 20, the interior fluid passage of the armature extends through the second end of the armature, a sectional diameter of the second end portion of the armature between the second end and the inwardly directed fluid flow paths reduced slightly relative to a sectional diameter of remaining portions of the second end portion of the armature defining a secondary fluid flow path from the fluid inlet of the armature, between the reduced sectional diameter portion of the armature and the housing member, and to the second end of the armature, whereby fluid flow along the secondary fluid flow path is circulated into the interior fluid passage of the armature.

* * * * *